June 22, 1965  R. H. SCHUMAN  3,190,156
CONSTANT SURFACE SPEED MACHINE TOOL
Filed July 20, 1960  5 Sheets-Sheet 1

INVENTOR.
RALPH H. SCHUMAN
BY Hudson, Boughton,
Williams, David & Hoffman
ATTORNEYS

June 22, 1965   R. H. SCHUMAN   3,190,156
CONSTANT SURFACE SPEED MACHINE TOOL
Filed July 20, 1960   5 Sheets-Sheet 4

INVENTOR.
RALPH H. SCHUMAN
BY Hudson, Boughton,
Williams, David & Hoffmann
ATTORNEYS

FIG. 8

United States Patent Office 3,190,156
Patented June 22, 1965

3,190,156
CONSTANT SURFACE SPEED MACHINE TOOL
Ralph H. Schuman, Cleveland, Ohio, assignor to The Warner & Swasey Company, Cleveland, Ohio, a corporation of Ohio
Filed July 20, 1960, Ser. No. 44,207
11 Claims. (Cl. 82—2)

The present invention relates to a machine tool including a control for maintaining a constant surface cutting speed between a rotating workpiece and a tool, and particularly, to a lathe embodying such a control.

Machine tools in which a rotating workpiece is machined by a cutting tool which is movable radially of the workpiece have been provided with a control which maintains a substantially constant surface cutting speed as the tool moves inwardly toward the axis of the workpiece. In one type of machine, the rotational speed of the workpiece is increased as the tool moves toward the axis thereof in order to maintain the surface speed at the tool constant. As is well understood by those skilled in the art, the rotational speed of the workpiece must vary nonlinearly with respect to the movement of the cutting tool if a constant cutting speed is to be maintained.

One of the problems in control systems for maintaining substantially constant surface cutting speed is that the tool cutting edge might be at any one of a plurality of positions with the tool slide in a given position. This presents a problem since the position of the slide is used to signal the diameter of the workpiece being operated upon by the cutting tool. Consequently, the cutting tool must have a reference position wherein it is at a predetermined position with respect to the workpiece for a given position of the slide if the position of the tool slide is to accurately signal the diameter of the work being machined. In many systems, the tool must be maintained in this reference position unless extremely complicated circuitry is used to compensate for offset from the reference position.

An important object of the present invention is to provide a machine tool including a substantially constant surface cutting speed control which can be compensated for offset of the tool from a reference position on the tool slide, with the system being so constructed and arranged that compensation for tool offset is accomplished in a relatively simple manner without requiring complicated or expensive circuitry or circuit elements.

Another object of the present invention is to provide a simple control system for maintaining substantially constant surface speed for a tool slide which may approach the axis of the workpiece from either of two opposite directions and for compensating for cutter offset from a reference position on the slide, with the compensation for cutting offset requiring a variation in a circuit element with the variation being of a magnitude linearly dependent upon the magnitude of tool offset from its reference position.

Another object of the present invention is to provide a new and improved control system for maintaining a substantially constant surface cutting speed in a machine tool wherein the offset of the tool on its tool-carrying slide which is used to signal the diameter of the work being machined can be compensated for by merely operating a plurality of relays which are coded in a binary system.

A further object of the present invention is to provide a new and improved control system for maintaining a substantially constant surface cutting speed between a rotating workpiece and a tool which can be readily compensated for offset of the tool with respect to a reference position relative to a slide which effects relative movement between a workpiece and the tool transversely of the axis of the workpiece and which is so constructed and arranged that the offset of the tool in either direction from the reference position can be readily compensated.

It is an object of the present invention to provide a new and improved control system for a machine tool for maintaining a substantially constant surface cutting speed and wherein the tool is supported on a slide which is movable transversely of the axis and arranged so that the cutting tool may be moved toward the axis from either of two opposite sides of the workpiece selectively, the control system being so constructed and arranged that a substantially constant surface cutting speed can be maintained regardless of the direction from which the tool approaches the axis of the workpiece.

Another object is to provide a new and improved system for maintaining constant surface cutting speed between a tool and rotating workpiece and wherein a feedback voltage dependent on motor speed is applied to the motor control circuit in opposition to a reference voltage to provide an error signal and wherein the feedback voltage for a given speed can be varied from a maximum to substantially zero by movement of a potentiometer tap from an end position to an intermediate position in the central area of the potentiometer.

In accordance with the preferred embodiment of the present invention, a slide which is movable toward and away from a workpiece to effect relative movement between a tool and rotating workpiece transversely of the axis of the workpiece adjusts a resistance in a circuit for controlling the speed of the motor rotating the workpiece to maintain a substantially constant surface speed, the resistance being adjusted changing the portion of the output of a motor tachometer which is fed back to a motor control circuit in opposition to a reference voltage to provide an error signal which, when present, effects an increase or decrease in the speed of the motor depending upon the sign of the error signal, and additional adjustable resistance is provided in the circuit which can be independently adjusted to vary the portion of the voltage fed back of the resistance means varied by the side to compensate the system for offset of the tool from a reference position. In the preferred and illustrated embodiment, the tool is carried by the slide and the slide is movable across the spindle axis so that the tool can be moved toward the workpiece from either one or two opposite directions and the slide is connected to actuate a sliding tap on a linear potentiometer. The potentiometer which is varied by a movement of the slide varies the portion of the output of the tachometer voltage applied to the motor control circuit and is connected into a bridge circuit so that an intermediate position on the potentiometer produces substantially zero feedback voltage from the tachometer and so that the movement of the tap of the resistance in either direction from the center position will unbalance the bridge and provide a feedback voltage which is a portion of tachometer output which varies with the magnitude of displacement of the tap from its intermediate position where the bridge is balanced. The reference voltage supply and the motor circuit are connected across bridge terminals so that the reference voltage supply is bucked by the tachometer voltage and so that when the bridge is balanced, substantially no tachometer voltage is applied to buck the reference voltage. Inasmuch as the output of the bridge with respect to the tachometer voltage would shift the polarity if the tap actuated by the tool slide crossed its balanced position, provision is made for interchanging the connections of the tachometer to the bridge to adjust the bridge for the conditions which occur when the slide crosses from one side of the spindle axis to the other side of the spindle axis thereby enabling the slide to be used to move a tool toward the workpiece from either of two directions. The resistance for adjusting the cutter offset is connected into the bridge and varies the portion of the tachometer voltage which is applied to the motor control circuit in opposition to the reference voltage. The circuit includes means for interchanging the adjustable resistance in the legs of the bridge so that cutter offset may be compensated for when the cutter offset is on either side of the reference position of the cutter.

Further objects and advantages of the present invention will be apparent from the following detailed description of the preferred embodiment thereof made with reference to the accompanying drawings forming a part of the present specification and in which.

While the present invention is susceptible of various arrangements, constructions, and modifications and of uses in various types of machine tools wherein a cutting tool is moved radially inwardly of a rotating workpiece, the invention is particularly suitable for use in a lathe and is herein shown as embodied in such a machine.

Figures 1, 2, 3, 4:
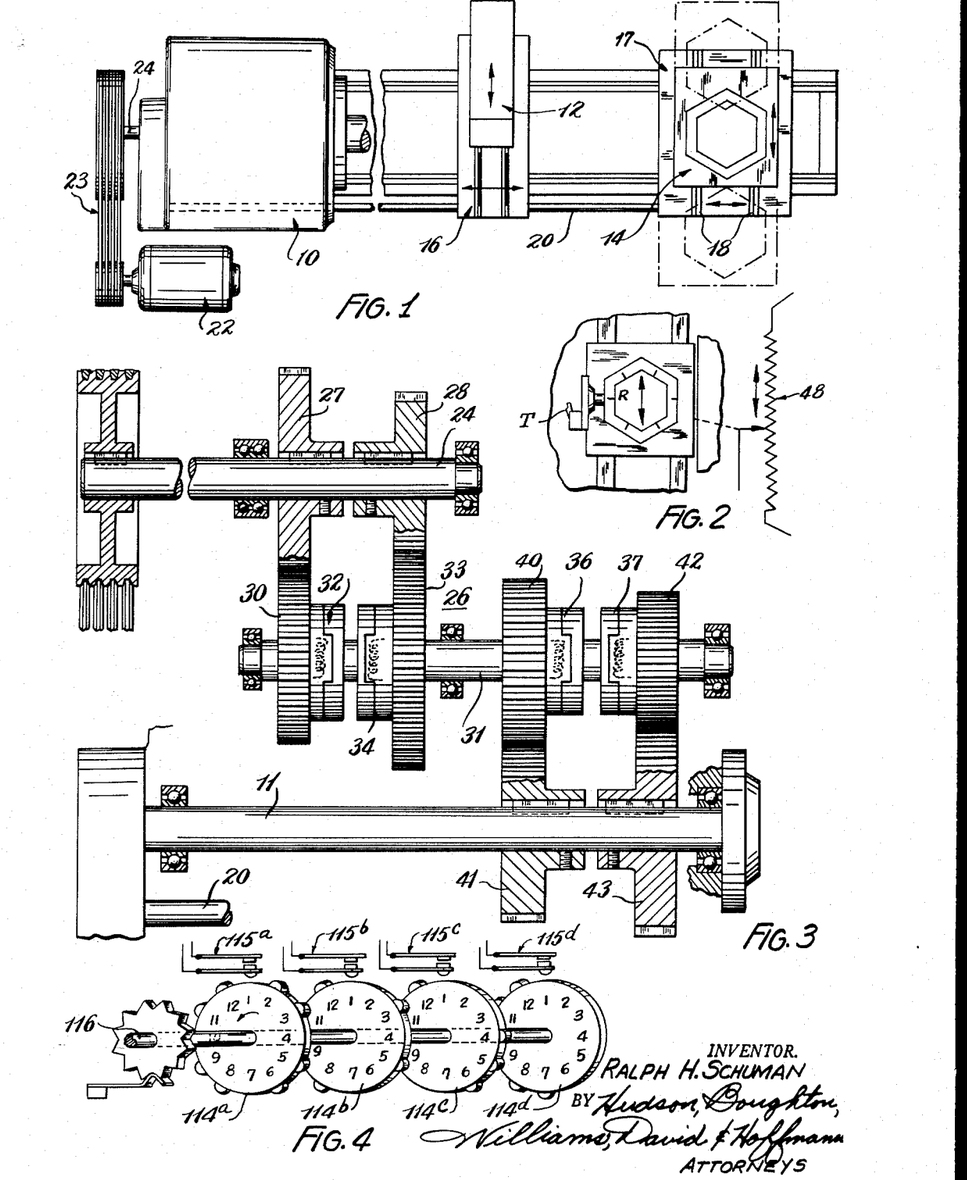
FIG. 1 is a plan view, somewhat diagrammatic, of a lathe which may embody the present invention.
FIG. 2 is a fragmentary view of the turret slide and turret saddle.
FIG. 3 is a showing, somewhat diagrammatic, of a drive for the spindle of the lathe of FIG. 1.
FIG. 4 is a diagrammatic perspective view showing a switch which is adapaed to be utilized with the control for the lathe shown in FIG. 1.

Referring to FIG. 1, the lathe shown therein comprises a headstock 10 including a spindle 11 adapted to support and rotate a workpiece to be operated upon by a cutting tool carried either by a cross slide 12 or by a cross sliding turret slide 14. The cross slide 12 is mounted on a cross slide carriage 16 which is movable parallel to the axis of the workpiece to move the cross slide 12 and the tool thereon through feed and return passes. Similarly, the cross sliding turret slide 14 is carried by a turret saddle 17 which is also movable parallel to the axis of the spindle to move the turret slide toward and away from the headstock. The cross sliding turret 14 is supported for movement across the axis of the spindle by ways 18 formed on the upper side of the turret saddle 17. Both the cross slide carriage and the turret saddle are selectively drivable parallel to the axis of the spindle from a feed shaft 20 which is geared to the spindle for rotation thereby. The feed shaft 20 may also be driven by a separate motor.

The spindle 11 and, in turn, the feed shaft 20 are driven by an electric motor 22 through a belt drive 23 connected to rotate a drive shaft 24 which is, in turn, connected to drive the spindle 11 through a series of gears and clutches which provide a speed change transmission 26. The shaft 24 has a pair of gears 27, 28 fixed thereto for rotation therewith. The gear 27 meshes with a gear 30, freely rotatable on an intermediate shaft 31, and is connectable to the shaft 24 to drive the shaft 31 therefrom by the energization of an electric clutch 32. The gear 28 of the shaft 24, similarly, meshes with a gear 33 which is freely rotatable on the intermediate shaft 31 and is connectable to the shaft 24 to drive the shaft 31 therefrom by the energization of an electric clutch 34. It can be seen that by selectively energizing either the clutch 32 or the clutch 34, the shaft 31 may be driven at either one of two speeds from the shaft 24. The shaft 31, in turn, is connectable to drive the spindle 11 by the energization of either an electric clutch 36 or an electric clutch 37. Energization of the clutch 36 connects the shaft 31 to drive a gear 40 rotatably supported thereon and which meshes with a gear 41 keyed to the spindle 11, while the energization of the clutch 37 connects the shaft 31 to drive a gear 42 rotatably supported on the shaft 31 and which meshes with a gear 43, also fixed to the spindle 11. The drive through the gears 40, 41 is of a different ratio than the drive through gears 42, 43, and, therefore, the spindle 41 may be driven from the shaft 31 through either of two different gear ratios. Accordingly, it will be readily perceived that by energizing the clutches in different combinations, the drive shaft 24 can effect rotation of the spindle 11 at any one of four possible speeds for a given rotational speed of the motor 22. Preferably, the speeds differ from each other by equal ratios, such as 1½ or 2.

The motor 22 is a variable speed motor and the speed of the motor is varied as the cutting tool moves inwardly toward the axis of the workpiece to control the surface cutting speed.

Figure 5:
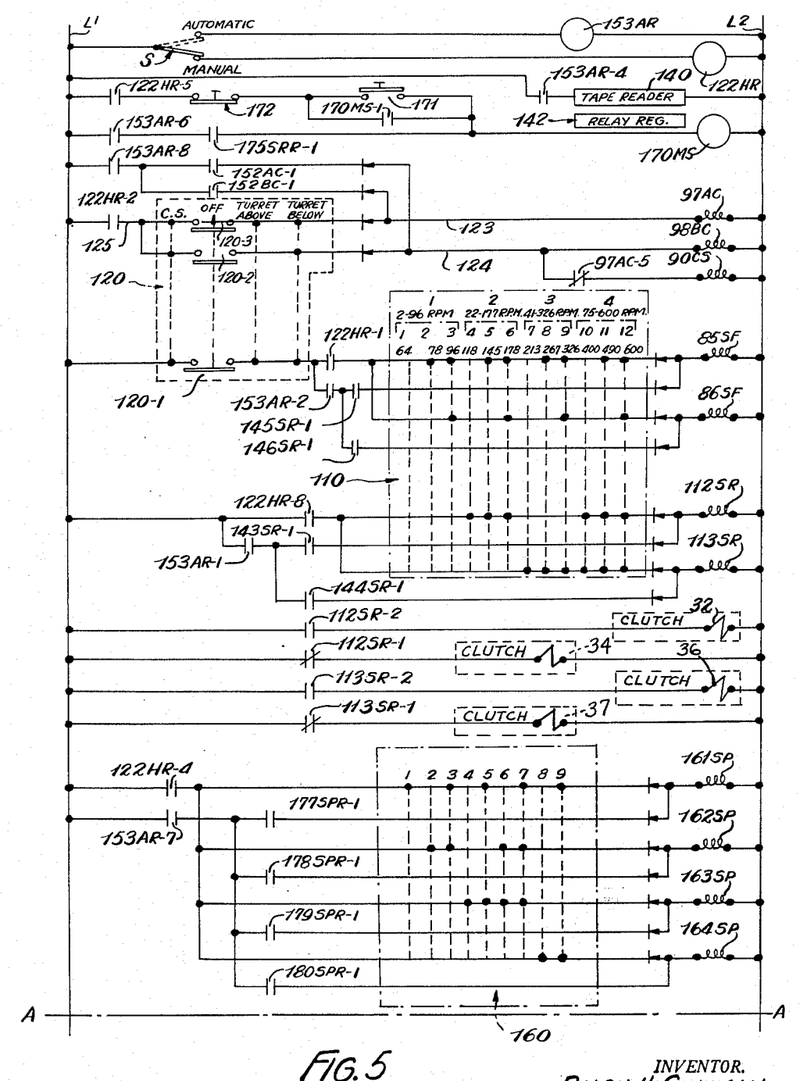
FIGS. 5 and 5A are a circuit diagram of a control circuit for the spindle motor for rotating the spindle of the lathe.
Figure 5A:
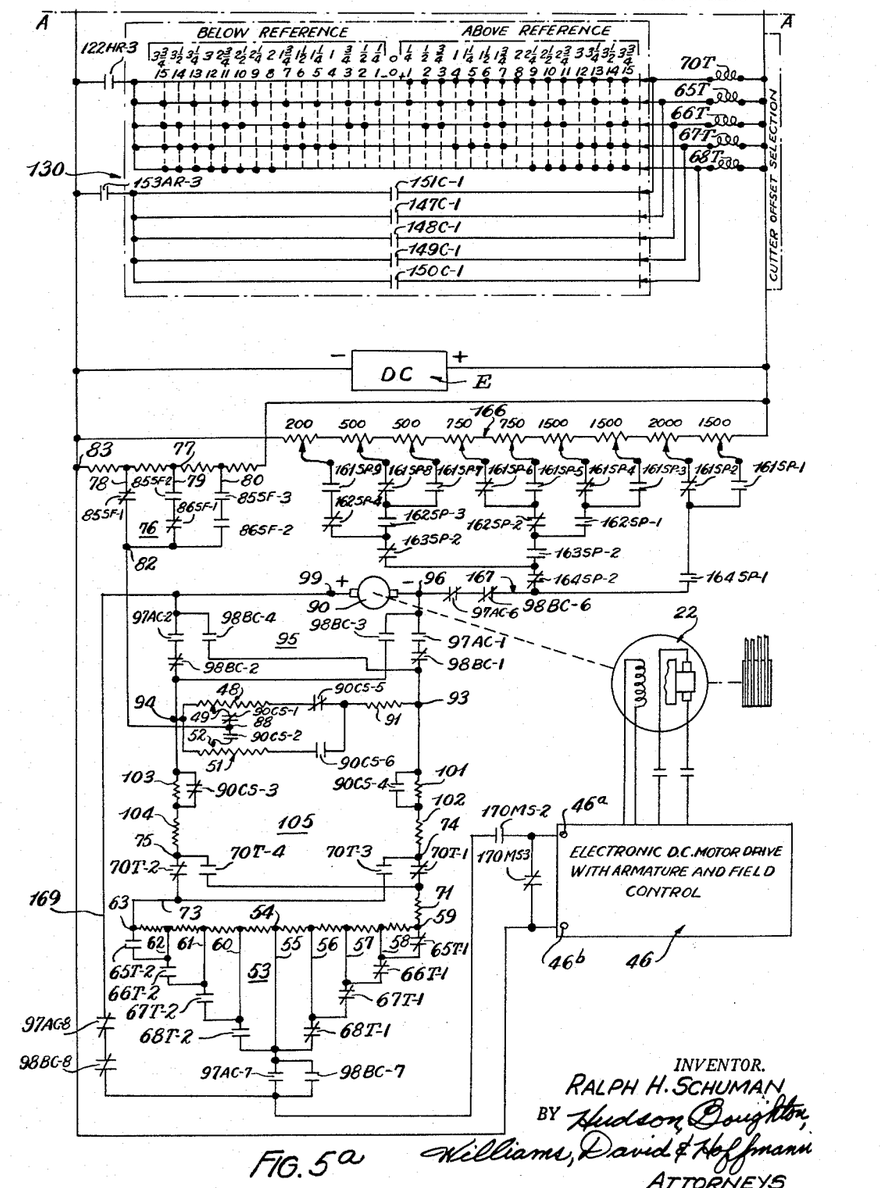

The motor 22 is shown schematically in FIGURE 5A of the drawings and is illustrated as being controlled by a motor control circuit 46 which effect the change in speed of the motor in accordance with a direct current error signal applied at input terminals 46a, 46b. The motor control circuit 46 is not shown and will not be described in detail since it is not, per se, a part of the present invention, and since such circuits are commercially available as packaged units. Suffice it to say that the motor control circuit 46 operates to increase the speed of the motor 22 if a positive voltage is applied to terminal 46a and to decrease the motor speed if a negative voltage is applied to terminal 46a.

In the illustrated embodiment, a reference signal indicative of a desired motor speed is applied to the terminals of the motor control circuit 46 and is derived from a reference voltage resistance circuit 76. The reference voltage signal is bucked by a feedback signal derived from a motor tachometer 90. The feedback signal may be derived by other circuit means, such as circuit means which provide a signal dependent on the back E.M.F. of the motor. When the feedback signal is of the same magnitude as the reference signal applied to the terminals 46a, 46b, the error signal to the motor control circuit 46 is zero and the motor operates without change in speed, while if one or the other signals increases or decreases, the speed of the motor will change to drive the tachometer 90 at the speed necessary to reduce the error signal to zero.

The portion of the tachometer voltage that is fed back to the motor control circuit 46 is variable by moving the tap 49 or 52 of either the potentiometer 48 or 51. The slidable taps 49, 52, are respectively connected to the turret slide and to the cross slide so that the taps are moved as either the cross slide or the turret slide moves across the axis of the spindle. Only one of the potentiometers is in the circuit at any given time and movement of the tap of that potentiometer varies the portion of the tachometer voltage which is applied to the motor control circuit 46. As the corresponding slide moves toward the spindle axis, that portion of the tachometer voltage fed back is decreased so that the tachometer has to be driven at a higher speed to buck out the reference voltage. Accordingly, the speed of the motor 22 will be increased as the slide being controlled moves toward the axis of the workpiece and, conversely, will decrease if the slide moves in the opposite direction. The operation of the potentiometers 48, 51 are explained in more detail hereinafter.

The potentiometers 48, 51 may be said to signal the position of the cutter tool with respect to the axis of the workpiece to adjust the speed of the motor 22 to maintain a substantially constant surface cutting speed as the tool moves inwardly toward the axis of the workpiece. It will be appreciated that the potentiometers 48 and 51 accurately signal the cutting position of the tool on the corresponding slide, provided the tool is located in a predetermined position on the turret slide, which shall be called the reference position. Referring to FIG. 2, the turret slide may carry reference marks R which, indicate the normal position of the cutting edge of the tool T on the turret. Cutting tools, however, may be mounted on the slide at various positions along the line of movement of the cutting tool toward and away from the axis of the workpiece and, accordingly, the present invention provides circuit means for compensating the signal which is applied to the motor control circuit 46 for cutter offset, i.e., the offset of the cutter in a radial direction from the reference position where the potentiometer accurately reflects the position of the tool. The signal is adjusted for cutter offset by means of a dividing circuit 53 included in the input circuit for the motor control circuit 46.

As was pointed out hereinbefore, the turret slide 14 may move toward the axis of the workpiece from either of two directions, from either a position above the workpiece or a position below the workpiece, as the latter is viewed in FIG. 1. When the turret slide is moving toward the workpiece from a position above the workpiece, offset of the tool downwardly from the reference mark with respect to the turret slide would call for an increase in spindle speed for the corresponding position of the cutter; while if the turret slide were approaching the axis of the workpiece from the lower side of the workpiece, offset of the cutter downwardly from its reference position would call for a decrease in the speed of the spindle. Accordingly, the input circuit is such that adjustment can be made to accommodate offset in accordance with whether the turret slide is approaching the workpiece from above or below, as it is viewed in FIG. 1.

Referring to FIG. 5A, it will be seen that the variable resistance circuit 53 comprises a resistance having a plurality of taps including a center tap 55 and taps 56, 57, 58 proceeding to one end, the end 59 of the resistance, and taps 60, 61 and 62 proceeding to the other end, the end 63 of the resistance. The end 59 of the resistance 54 is connected to the adjacent tap 58 by normally closed contacts 65T-1 actuated by a turret offset relay coil 65T and the tap 58 is, in turn, connected to the tap 57 by normally closed contacts 66T-1 of a turret offset relay coil 66T. Similarly, the tap is connected to the tap 56 by normally closed contacts 67T-1 of a turret offset relay coil 67T, and the tap 56 is connected to the center tap 55 of the resistor 54 by the normally open contacts 68T-1 of a turret offset relay coil 68T. Similarly, the end 63 of the resistor 54 is connected to the adjacent tap and each of the adjacent taps to the next adjacent tap toward the center tap 65 by the normally open contacts 65T-2, 66T-2, 67T-2, 68T-2, actuated by the relay coils 65T, 66T, 67T, 68T, respectively. It can be seen that the voltage between the center tap 55 and the end 59 of the resistance 54 will vary from a short circuit when none of the relay coils 65T . . . 68T are energized, to a maximum when all coils are energized and all of the contacts 65T-1, 66T-1, 67T-1 and 68T-1 are opened. Similarly, it will be appreciated that when any of coils 65T . . . 68T are energized to place one of the resistance sections between the end 59 and the tap 55 in the circuit, a corresponding section is removed from between the tap 55 and end 63. Preferably, the resistance sections of the resistance 54 proceeding from the center tap 55 to the end tap 63 have resistance values which are related as 8, 4, 2, 1. Similarly, the values of the resistance sections proceeding from the center tap 55 to the end tap 59 are related as the values of 8, 4, 2 and 1. It can be seen that the relay coils 65T . . . 68T provide a register adapted to register a binary number which is converted by the resistance 54 to provide an analogue voltage which is variable by units in accordance with the magnitude of the binary number registered in the coils 65T . . . 68T.

It will be observed that in the case of proceeding from the end tap 59 to the center tap 55, the energization of one of the relay coils 65T increases the resistance and, consequently, increases the voltage drop between the center tap 55 and the end tap 59; while, when proceeding from the center tap 55 to the end tap 63, the energization of any of the coils 65T . . . 68T decreases the resistance in the path and, consequently, the magnitude of any voltage drop between the end terminal 63 and the center tap 55.

If the turret slide is above the reference position for the tool on the slide, a relay coil 70T is energized. The relay coil 70T has normally closed contacts 70T-1 and 70T-2. The contacts 70T-1 connect the end terminal 59 through a resistor 71 to a junction 74 and the contacts 70T-2 connect the end terminal 63 of resistance 54 to a junction 75. When the contacts 70T-1 and 70T-2 are closed, the junction 74 is connected to the end tap 59 through resistor 71 and the junction 75 is connected to the end tap 63. If, however, the relay coil 70T is energized, the normally closed contacts 70T-1, 70T-2 are opened and normally open contacts 70T-3 and 70T-4 are closed. These contacts 70T-3, 70T-4 connect the junction 74, to the terminals 63, and the junction 75 to terminal 59 through resistor 71 to reverse the connections between the junctions 74, 75 and the variable resistance from what they were when the relay was de-energized. Consequently, it can be seen that when the relay coil 70T is de-energized, the resistance in the circuit between junction 74 and the center top 55 is increased by enerization of the relay coil 65T, and the resistance between the junction 75 and the center tap 55 is decreased by the energization of the same coil. While, if the relay coil 70T is energized, just the opposite occurs upon the energization of the relay coils 65T . . . 68T. The relay coil 70T is energized when the tool is above its reference position and de-energized when the tool is below its reference position.

The resistance of resistor 71 preferably is chosen so that it has a magnitude corresponding to the total magnitude of all resistance sections of one-half of the resistance 53. This means that when all sections between the resistor 71 and the center tap 55 are short-circuited, the resistance 53 and resistor 71 are in effect a center-tapped resistance with the tap 55 as the center tap.

It can now be seen that the signal which is applied to the motor control circuit depends upon the position of the turret slide or of the cross slide, as the case may be, and is adjustable to compensate for the position of the tool on the particular slide.

As mentioned hereinbefore, the speed of the motor is controlled in accordance with a reference voltage which is supplied by voltage reference circuit 76. The circuit 76 comprises a resistance 77 connected across a D.C. source E. The resistance 77 is a multitapped resistance having three taps 78, 79, 80 intermediate its ends. Each of the taps 78, 79, 80 can be selectively connected and disconnected to a junction 82. The voltage between the junction 82 and the negative side of the D.C. power supply E, which is connected to an end tap 83 at one end of the resistance 77 and to the input circuit for the motor control 46 depends upon the connection of the taps 78, 79, 80 to the junction 82. As shown in FIG. 5A, the tap 78 is connected to the junction 82 by a connection including normally closed contacts 85SF-1 actuated by a relay coil 85SF. The tap 79 is connected to the junction 82 by a connection including normally open contacts 85SF-2 actuated by the relay coil 85SF and normally closed contacts 86SF-1 actuated by the relay coil 86SF. The tap 80 is connected to the junction 82 by a connection including normally open contacts 85SF-3 and normally open contacts 86SF-2 actuated by the relay coils 85SF, 86SF, respectively. It can be seen that when neither of the relay coils 85SF, 86SF is energized, only the voltage drop appearing across the section of the resistance between the tap 78 and the tap 83 appears between the end terminal 83 and the junction 82, and that by energizing one or both of the relays, two other different voltages can be obtained at the junction 82.

As will be apparent from the drawing, the junction 82 is connected to a junction 88 which is, in turn, connectable to the tap 49 of the turret slide potentiometer 48 by normally closed contacts 90CS–1 of a relay coil 90CS which is energized when the constant surface cutting speed is to be used with the cross slide of the lathe. The junction 88 is also connected to the tap 52 of the cross slide potentiometer 51 by normally open contacts 90CS–2 which are closed when the cross slide relay coil 90CS is energized. The reference voltage which appears between the junction 82 and the end tap 83 of the variable resistance circuit 76 is applied to the input of the motor control 46 by circuit means including the potentiometer 48 or 51 and the variable resistance circuit 53.

The voltage applied to the motor control circuit 46 is a combined signal having a component which is derived from the voltage reference circuit 76 and a component derived from the direct current feedback tachometer 90 driven by the motor 22. The feedback tachometer 90 is connected into the input circuit across a resistor 91 and one of the potentiometers 48, 51 which is connected into the circuit, the resistor 91 being in series with the poteniometers 48, 51. For the purpose of the following description, it will be assumed that potentiometer 48 is connected into the circuit, unless otherwise mentioned. The series combination of the poteniometer 48, and the resistor 91 has a terminal 93 to which one end of the resistor 91 is connected, with the other end of the resistor 91 being connected to the poteniometer 48, and a terminal 94 to which the end of the potentiometer 48 remote from the resistor 91 is connected. The tachometer 90 is connectable to the terminals 93, 94 through a reversing circuit 95 which includes contacts which are actuatable to connect the plus terminal of the tachometer to either the terminal 93 or the terminal 94, with the negative terminal of the tachometer being connected to the other of the end terminals 93, 94.

The reversing circuit 95 includes contacts of a relay coil 97AC and of a relay coil 98BC. When the relay coil 97AC is energized, it closes its normally open contacts 97AC–1 to connect the negative terminal of the tachometer 90, designated by the reference numeral 96, to the terminal 93 through a connection including the normally open contacts 97AC–1 and the normally closed contacts of the relay coil 98BC, and designated by the reference numeral 98BC–1.

The energization of the relay coil 97AC also connects the positive terminal of the tachometer 90, which is designated by the reference numeral 99, to the terminal 94 by closing contacts 97AC–2 to complete a circuit from the positive terminal 99 through normally closed contacts 98BC–2 of the relay coil 98BC.

If both the relay coils 97AC and 98BC are energized, the opening of the contacts 98BC–1, 98BC–2 breaks the connection of the negative terminal 96 to the terminal 93 and the connection of the positve terminal 99 to the terminal 94 and interchanges the connections by closing contacts 98BC–3, 98BC–4 to connect the negative terminal 96 to the terminal 94 and the positive terminal 99 to the terminal 93.

To complete the input circuit, insofar as the purposes of the immediate description are concerned, the terminal 93 of the series circuit including the potentiometer 48 and the resistor 91 is connected to the input junction 74 of the dividing circuit 53 through series connected resistors 101, 102; and the terminal 94 of the series circuit including the potentiometers 48, 51 and the resistor 91 is connected to the input junction 75 of the dividing circuit by series connected resistors 103, 104. As is shown in FIG. 5, only one of the resistors 101, 103 is in the circuit at any one time, the resistor 103 being shunted by the normally closed contacts 90CS–3 of the relay coil 90CS, while the resistor 101 is shunted by normally open contacts 90CS–4 of the relay coil 90CS. The resistors 101, 103 adjust the circuit to have the proper characteristics for use with either the cross slide or the pentagon slide.

The potentiometer resistor 48 or 51 and the dividing circuit 53, together with the circuitry connecting the potentiometers 48, 51 and the divider 53 to the terminals 93, 94 and the junctions 74, 75, define a bridge circuit, designated generally by the reference numeral 105, with the terminals 93, 94 constituting two diagonally opposite terminals of the bridge circuit across which the tachomter 90 is connected, and with the center tap connection 55 of the dividing circuit 53 and either the sliding tap 49 or the sliding tap 52 of the potentiometers 48, 51, depending upon which is in the circuit, constituting the other diagonal terminals of the bridge circuit. For purposes of clarity, a simplified circuit diagram is shown in the drawings as FIG. 6 and the circuit in this figure has been shown in the form of a bridge circuit for the condition wherein the relay coils 97AC and 98BC are energized and the relay coil 70T de-energized, signifying that the turret slide is below the workpiece axis and that the tool is at reference or offset below its reference position on the turret slide.

Figure 6:
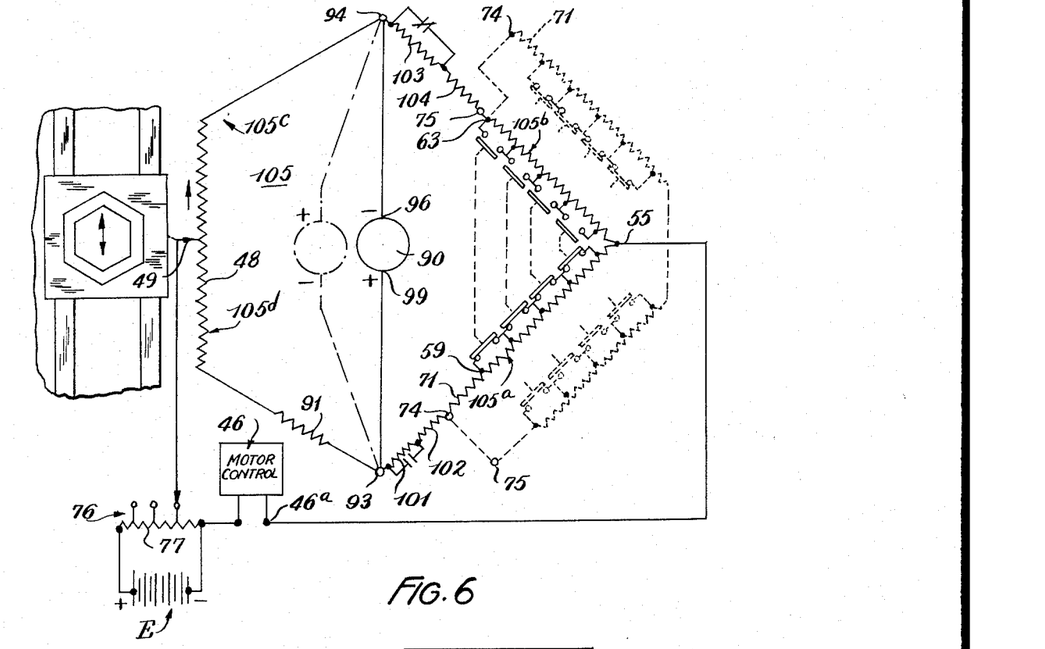
FIG. 6 is a simplified circuit diagram.

In this condition, it will be noted that the positive terminal of the tachometer 90 is connected to the terminal 93 and the leg of the bridge between the terminal 93 and the center tap 55 includes the resistor 71. The leg of the bridge between the center tap 55 and the terminal 93 is designated by the reference character 105a and includes the portion of the dividing circuit 53 from the center tap of the divider to the end tap 59, while the leg from the center tap to the terminal 94, designated by the reference character 105b, includes the portion of the dividing circuit between the center tap and end terminal 63. The other side of the bridge is formed by the potentiometer 48 or 51, depending upon which one of the potentiometers is in the circuit, and for purposes of explanation, the potentiometer resistance 48 has been selected, with the tap of the potentiometer resistance dividing the other side of the bridge into two legs, 105c, 105d, and constituting a terminal of the bridge circuit. The reference voltage circuit 76 is connected in series with the input terminals of the motor control 46 across the diagonal of the bridge defined by the terminal at the sliding tap 49 and the terminal provided by the center tap 55 of the dividing circuit 53.

It will be apparent that when the bridge 105 is balanced, no voltage from the tachometer 90 appears across the sliding tap 49 and the center tap 55 of the potentiometer 48 and the resistance dividing circuit 53, respectively, and, therefore, the reference voltage being applied to the motor control circuit 46 is not bucked by the output of tachometer 90. This would tend to make the motor run at an infinite speed, but, as a practical matter, the motor and the motor control circuit 46 have a maximum speed which cannot be exceeded. It will be further apparent from FIG. 6 that if the sliding tap 49 is moved downwardly from its position where the bridge is balanced, the tap 49 becomes more positive with respect to the center tap 55 of the voltage dividing circuit 53 and, in turn, with respect to the terminal 46a of the motor control circuit. Accordingly, a voltage is applied to the motor control circuit 46 from the tachometer 90 which bucks the reference voltage from the reference voltage circuit 76 and this voltage increases as the tap 49 is moved downwardly in FIG. 6 and the motor will run at a progressively slower speed since the movement of the tap 49 downwardly applies a larger portion of the tachometer voltage to the motor control circuit 46 in opposition to the voltage from the reference voltage circuit 76. The turret slide is connected to the tap 49 so that when the bridge is balanced, for the operating conditions for which the circuit of FIG. 6 is set, the turret slide is positioned where the cutting tool is at the axis of the workpiece when the tap 49 is at the bridge balanced position on the potentiometer 48; and movement of the turret slide downwardly to move the tool away from the axis causes the sliding tap 49 to move downwardly along the potentiometer 48, applying a voltage in opposition to the reference voltage. The difference in voltage is applied to terminals 46a, 46b to decrease the speed of the motor 22. The movement of the tap controls the portion of the tachometer output voltage which is applied in bucking relationship and, consequently, determines the speed of the motor. As the portion of the output voltage from the tachometer is increased, the speed of the motor will decrease, since the motor need only operate as a slower speed to buck out the reference voltage. While the potentiometer 48 is a linear potentiometer, the variation in motor speed as the tap 49 is moved downwardly will be more in the nature of a hyperbolic function, since as the tap moves halfway down on the resistance, the motor speed halves and as it moves from the halfway position to the three-quarter position, the motor speed again halves. This will be better appreciated when it is understood that each time the tap is moved to transfer one-half of the resistance in leg 105d to leg 105c, the portion of the applied tachometer voltage is doubled and the motor 22 must half its speed to merely buck out the reference voltage. This is appropriate since the motor speed must vary in this manner if a constant surface cutting speed is to be maintained.

When the sliding tap 49 is moved from the lower end of the resistance 48, as viewed in FIG. 6, upwardly toward the center or balanced position as the slide moves from a maximum down position toward the axis of the workpiece, the converse of the preceding description will take place and the terminal 46a will become increasingly positive with respect to the terminal 46b as the tap 49 approaches the balanced condition and the speed of motor 22 will increase.

As the turret slide moves through its position where the cutting tool thereon crosses the center of the axis, the tap 49 due to the tachometer voltage will become increasingly negative with respect to the center tap 55 and, in turn, with respect to the terminal 46a of the motor control circuit. If the connections were maintained as in FIG. 6, as the turret slide and cutting tool cross the axis of the spindle, the voltage from the tachometer 90 would be in an additive relationship to the voltage from the voltage reference circuit 76 and the motor would tend to assume an infinite speed regardless of the position of tap 49. Accordingly, the connections of the tachometer 90 to the bridge circuit are reversed and this is done by de-energizing relay coil 98BC and energizing, or maintaining energized, relay coil 97AC. The connections of the tachometer 90 for this condition are shown in dot-dash lines in FIG. 6. It will now be appreciated that as the sliding tap 49 moves upwardly as the turret slide moves upwardly above the center of the workpiece, an increasingly larger portion of the tachometer voltage 90 will be applied in opposition to the voltage from the reference voltage circuit 76 and the motor will slow as the turret slide and cutting tool thereon move away from the axis of the workpiece.

Figure 8:
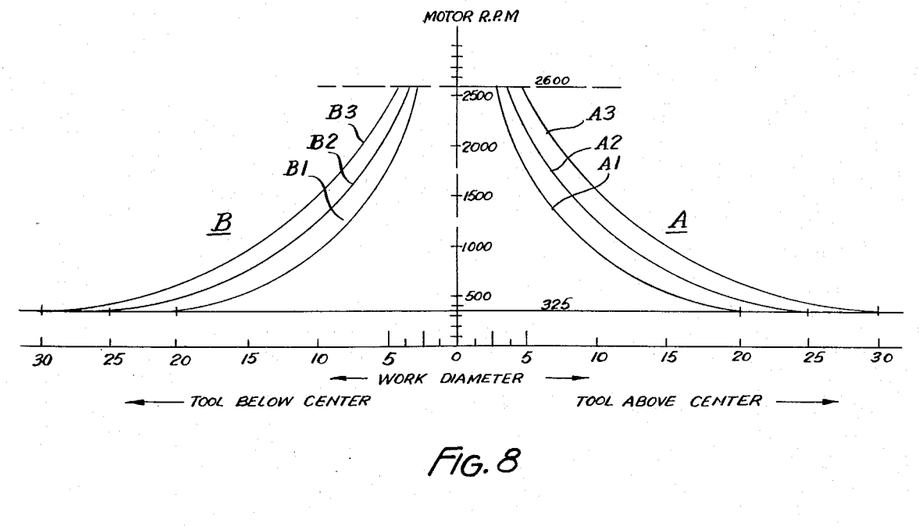
FIG. 8 is a graph showing motor r.p.m. as a function of the diameter of the workpiece.

The effect of changing the level of the voltage supplied by the reference voltage circuit 76 is best illustrated in FIG. 8 of the drawing. FIG. 8 is a graph which plots motor speed against the position of the tool from the spindle axis, i.e., work diameter, and includes two sets of curves A and B. The sets of curves A and B are for the tool above center and below center, respectively.

For any given motor speed, the portion of the tachometer voltage need which must be fed back to provide a voltage sufficiently large to buck out the reference voltage depends upon the magnitude of the reference voltage. Consequently, when the lowest reference voltage is used, the tap 49 to operate the motor at any given speed is at a position closer to the balanced position of the bridge than for any of the other reference voltages. When the reference voltage is raised, a higher portion of the voltage from the tachometer 90 must be fed back to produce a particular motor speed, to buck out the reference voltage at that speed and as a result, the tap 49 to provide the given motor speed must be moved outwardly away from the balanced position of the bridge to a position providing a larger output voltage. In effect then, the changing of the reference voltage effects a change of the mechanical coupling between the tap 49 and the slide so that the position of the slide at which the potentiometer operates to provide a given motor speed is shifted with the changing of the reference voltage. Referring to FIG. 8, curves A1, B1 indicate motor speed for a given position of the tool, i.e., work diameter, at the lowest reference voltage, and the curves A2, B2 indicate motor speed for a given tool position for the next higher reference voltage, and curves A3, B3 indicate motor speed for a given position of the tool for the highest reference voltage. Preferably, the potentiometer 48 is such that when the slide and cutter are set to accommodate the largest work diameter, the portion of the tachometer voltage applied to buck out the reference voltage is large enough to buck out the highest reference voltage when the motor is operating at its lowest possible speed. With this arrangement, the potentiometer 48 is effective to vary the speed of the motor 22 over its entire speed range for each of the settings of the reference voltage supply and the changing of the reference voltage supply merely shifts the curves of motor speed versus tool position laterally as shown in FIG. 8 to effectively change the mechanical coupling between the slide and the tap 49.

It will be obvious from the preceding discussion that if the potentiometer is to accurately control the cutting speed of motor 22 to maintain substantially constant surface cutting speed, the cutting tool must have a given relationship to the axis of the workpiece for each position of the tap 49. As pointed out hereinbefore, this will be called the reference position of the tool. If the tool is offset one way or the other from this reference position along the line of movement of the tool, compensation must be made in the circuitry if the circuit is to maintain a desired constant cutting speed. The voltage dividing circuit 53 is adjusted or set to compensate for the offset.

The circuit shown in FIG. 6 is the condition of the circuit of FIGS. 5 and 5A when the turret slide is below the workpiece and the tool is at the reference position wherein the relay coil 70T is de-energized. In this condition, it will be noted that the resistance between the junction 74 and the center tap 55 is provided by the resistance 71 and the resistance between the center tap 55 and the junction 75 is provided by the entire portion of the divider on that side of the center tap 55. The resistance 71 is selected so that in this condition the resistance 71 and the portion of the dividing circuit 53 between the center tap 55 and end terminal 63 constitutes a center-tapped resistance. If it is assumed that the tool is offset one unit below the reference mark, the relay coil 65T is energized to close its contacts 65T-2 and open its contacts 65T-1. This places one unit of resistance in series with the resistor 71 and short-circuits one unit of resistance from the leg 105b of the bridge. The circuit is now compensated for the offset of the tool since the tap 49 must now be moved an extra unit of resistance upwardly before the bridge will be balanced with respect to the tachometer 90, and the turret slide, therefore, must move one-unit distance farther than previously necessary to position the cutting tool at the axis of the workpiece. By selectively transferring resistance from the leg 105b of the bridge to the leg 105a of the bridge through selective energization of the coils 65T . . . 68T, the circuit is set to adjust for various cutter offsets.

If the tool were offset above its reference position, the relay coil 70T would be enrgized. This interchanges the connection of the junctions 74, 75 with respect to the bridge circuit and the junction 74 is now connected into the leg 105b and the junction 75 connected into the leg 105a so that the resistor 71 is now in the leg 105b, together with the short-circuited portion of the voltage dividing circuit 53, and the other portion of the voltage dividing circuit is connected into the leg 105a so that when the coils 65T . . . 68T are energized, resistance is transferred from the leg 105a to the leg 105b to make the center tap 55 less positive for any given setting of the slider tap 49. With the tap 55 being made less positive with respect to the sliding tap 49, a smaller portion of the tachometer 90 is being applied to the terminals 46a, 46b of the motor control circuit 46 and the motor 22 will operate at a higher speed. This is appropriate since for a given setting of the turret slide, offset of the tool toward the axis of the workpiece from its reference position calls for an increase in spindle speed if a substantially constant surface cutting speed is to be maintained.

The voltage reference circuit 76 is adapted to provide three different reference voltage levels. The lowest reference voltage level is provided when none of the relays 85SF, 86SF are energized, the next voltage level is provided with the relay coil 85SF energized, and the next voltage level is provided when both the relay coil 85SF and the relay coil 86SF are energized. Therefore, three different constant cutting speeds are available by selective energization of the relay coils 85SF, 86SF.

The foregoing description has been with respect to the turret slide. It will be appreciated that if the potentiometer 51 is connected into the circuit instead of the potentiometer 48, the motor speed will be controlled by movement of the cross slide. In this case, the bridge is connected in the same manner as it is for the turret slide above the workpiece since the cross slide only operates to move a tool toward the workpiece from above.

The energization of the relay coils 85SF, 86SF is controlled, in the illustrated machine, by a selector switch 110, shown schematically in FIG. 5 of the circuit drawing. The selector switch 110 has twelve possible positions divided into four groups, with three positions allotted to each group. The four groups of positions of the selector switch 110 correspond to the four different transmission ratios of the spindle transmission 26, and the three positions within each group correspond to the three different constant surface cutting speeds available within the range. Accordingly, when the switch 110 is in a position within the first group, the spindle change speed transmission 26 has a first gear ratio and the drive motor can be operated to maintain any one of three possible constant surface cutting speeds depending upon whether the switch is in its first, second, or third position. When the switch is in its first position, the relay coils 85SF, 86SF are de-energized so that the minimum constant surface cutting speed is selected. When the switch is in its second position, the relay coil 85SF is energized to provide a constant surface cutting speed at an intermediate speed, and when the switch is in its third position, both the relay coils 85SF, 86SF are energized to provide the highest available constant surface cutting speed for that range of the transmission. Similarly, the switch, when rotated to one of its No. 4, 5, or 6 positions within group 2, effects operation of the motor 22 in accordance with the number of the switch position to provide three additional different cutting speeds since the gear ratio through the spindle transmission has been changed. Similarly, the movement of the switch to any one of its positions between 7 and 9, or 10 and 12 effects motor operation to provide three cutting speeds for the corresponding spindle transmission ratio.

The spindle switch may be any one of a number of different types of conventional multiple-position switches and in the circuit diagram the switch is shown as having twelve positions indicated by a vertical dotted line for each position, which lines intersect connections leading to respective output connections from the switch that controls the energization of relay coils 85SF, 86SF, 112SR, 113SR, and when the switch in a particular position makes contact with a particular connection, the intersection of the dotted vertical line for that position and the output connection has a dot applied thereto.

When the switch 110 is in any of its first three positions, the relay coils 112SR, 113SR are de-energized. When the switch is in any of its positions from position 4 to position 6, the relay coil 112SR is energized, and when the switch is in any of its positions 7-10, the relay coil 113SR is energized; while, when the switch is in any of its positions 10-12, both the relay coils 112SR, 113SR are energized. The circuits for energizing relay coils 112SR, 113SR include the normally open contacts 122HR-3 of a manual operation relay 122HR described in more detail hereinafter.

The relay coils 112SR, 113SR control the energization of the spindle clutches 32, 34, 36, 37, as shown schematically in FIG. 5. When relay coils 112SR and 113SR are de-energized, clutches 34, 37 are energized since the contacts 112SR-1, 113SR-1 of relay coils 112SR, 113SR, respectively, in the energizing circuits therefor are normally closed contacts. When the relay coil 112SR is energized, the clutch 32 is energized and the clutch 37, since the relay coil 112SR has normally open contacts 112SR-2 in the circuit for energizing clutch 32 and the clutch 37 is energized through a circuit including the normally closed contacts 113SR-1 of the relay coil 113SR. When the relay coil 113SR is energized, as is true when the switch 110 is in any of its positions 4, 5, 6, the clutch 34 and the clutch 36 are energized, since the circuit for energizing the former is controlled by the normally closed contacts 112SR-1 of relay coil 112SR and the circuit for the latter includes the normally open contacts 113SR-2 of the relay coil 113SR. Similarly, it can be seen from the circuit that when both the relay coils 112SR, 113SR are energized, the clutches 32, 36 are energized and clutches 34, 37 de-energized. Accordingly, a different spindle transmission is selected for each group of three switch positions of the selector switch 110, and the selector switch is operable to select any one of three constant surface cutting speeds for that particular spindle transmission ratio.

The particular switch utilized with the present invention does not, per se, form a part of the present invention and any commercial multiple-position switch for controlling a plurality of circuits may be utilized. FIG. 4, however, schematically shows a type of switch which may be utilized. As shown in FIG. 4, four discs 114a 114b, 114c, 114d are shown and each controls a corresponding switch 115a, 115b, 115c, 115d which controls the connection of four conductors to a single input conductor to the switch. The discs are mounted on a rotatable shaft 116 and each disc has angularly spaced cams thereon disposed in positions to actuate the corresponding switch when the shaft is rotated to a position where the switch is to be actuated. When the shaft is rotated from its zero position to any one of its twelve possible angular positions, the output switches are actuated in the proper combination to effect energization of the proper output conductors. In the illustrated embodiment, the closing of switch 115a energizes the relay coil 85SF, the closing of switch 115b energizes the relay coil 86SF, while the closing of the third and fourth switches 115c, 115d energizes the relay coils 112SR, 113SR, respectively.

When the machine is to be operated with a constant surface cutting speed, a selector switch 120 is actuated to complete a circuit which controls the energization of relays 97AC, 98BC and 90CS and which connects the input side of the switch 110, to L1, the negative side of the power supply, to render the switch effective to control the energization of relay coils 85SF, 86SF.

The switch 120 is a conventional type switch and has contacts 120-1, 120-2, 120-3 which are selectively closed when the switch is turned to any of its three possible "on" positions. The contacts 120-1, when made, complete a circuit from L1 to the switch 110 through the normally open contacts 122HR–1 of the manual operation relay 122HR when the relay 122HR is energized.

The contacts 120–2, 120–3 of the switch 120 are in circuits for connecting output conductors 124, 123, respectively, to a conductor 125 which is connected to L1 through the normally open contacts 122HR–2 of the manual operation relay 122HR. The conductor 123 is connected to the coil 97AC and is connected by the switch 120 to the conductor 125 whenever the switch is in either one of its two positions to the right of the "off" position shown in FIG. 5. The conductor 124 is connected to the relay coil 98BC and to the relay coil 90CS and is energized from the conductor 125 through the switch 120 by positioning the switch in its position to the left of its "on" position shown in FIG. 5 or to the second position to the right of its "off" position shown in FIG. 5. When the switch 120 is in the last-described position and the contacts 122HR–2 are closed, both the coils 98BC and 90CS are energized to select the cross slide as the slide for controlling the constant surface cutting speed operation. While when the switch 120 is in the first position to the right of the "off" position shown in FIG. 5 and the contacts 122HR–2 are closed, the coil 97AC is energized and the turret slide is selected to control the constant surface cutting speed and it is indicated that the turret slide is above center; while when the switch 120 is in its second position to the right of its "off" position, both the coil 97AC and the coil 98BC are energized to select the turret slide as the slide for controlling the constant surface cutting speed operation and to indicate that the turret slide is below center. It will be noted that when the relay coil 97AC is energized, it opens its normally closed contacts 97AC–5 in the circuit for energizing the relay coil 90CS to prevent the energization of the relay coil when the conductor 124 is energized to energize the relay coil 98BC.

From the foregoing it can be seen that the switch 120 is operated to select whether the cross slide 12 or the turret slide 14 is to control the substantially constant surface cutting speed and to indicate whether or not the turret slide, if the latter is to control, is above the work axis or below the work axis. If the cross slide 12 is to control, the relay coils 90CS and 98BC are energized to select the potentiometer 51 as the feedback potentiometer. The potentiometer 51 is selected since the energization of relay 90CS closes its contacts 90CS–5 and opens its contacts 90CS–6 in series with the potentiometer 48, 51 respectively. The energization of the coils 98BC, 90CS also connects the tachometer 90 across the bridge circuit with the proper polarity as described hereinbefore. The selector switch 110 is set to determine the cutting speed which is to be maintained, and the switch selects both the spindle transmission ratio and the basic range of slide position to control the motor 22 by selecting the reference voltage level provided by the reference voltage circuit 76.

If the tool is offset from the reference point on the slide which is chosen, the dividing circuit 53 is set to compensate for the offset. It will be recalled that the dividing circuit 53 is adjusted by energizing a selected one or combination of relay coils 65T . . . 68T and 70T.

In the preferred and illustrated embodiment, the relay coils 65T . . . 68T, and 70T are selectively energized by operating a selector switch 130 which is shown schematically as a switch capable of rotation from a zero position to fifteen positions on one side of the zero position and to fifteen possible positions on the other side of the zero position. The switch is connected to one side of the power supply E through contacts 122HR–3 of the relay 122HR and in each position of the switch, except the zero position, a circuit or combination of circuits is made to one or a combination of a plurality of output conductors, respectively, connected to energize one of the coils 65T . . . 68T and 70T. Each position of the switch is represented in FIG. 5A by a dotted vertical line, and when a circuit is completed to one of the output conductors for a given switch position, a dot is placed at the intersection of the output conductor with the vertical position line of the switch. Accordingly, in the first position to the right of zero position, as viewed in FIG. 1, the coil 70T and the coil 65T are energized, while when the switch is in position No. 15 to the right of the zero position, all coils 65T . . . 68T and 70T are energized. It will be noted that in all of the right-hand positions the coil 70T is energized and conditions the circuit for operation with the cutting tool offset above the reference line on the corresponding slide. The sides of the coils 65T . . . 68T and 70T not connected to the switch 130 are connected to the positive side of the D.C. power supply E. The switch 130 has not been described in detail since it may be of conventional construction and may be similar to that shown in FIG. 4.

When the machine is to be manually operated, a switch S is operated to energize manual operation relay 122HR, as shown in FIG. 5. This conditions the switches 110, 120 and 130 to be effective as described above.

The disclosed circuit is particularly adapted for operation in response to a tape or other intelligence-carrying member which is coded in a binary system. It will be apparent from the foregoing that the reference voltage for selecting the constant surface cutting speed for any given range of the spindle transmission is effected by energizing or de-energizing certain relays. The relays may be considered as having a 1 condition or a 0 condition. Similarly, the tool offset is compensated for by selectively energizing and de-energizing certain relays or certain combinations of relays, each of which is capable of having a 1 condition or a 0 condition, and the clutches are similarly selected by selective energization of relay coils which have 1 and 0 conditions. Accordingly, the disclosed control circuit is particularly adapted for actuation in response to an intelligence-carrying tape, particularly a tape coded in the binary system.

Figure 7:
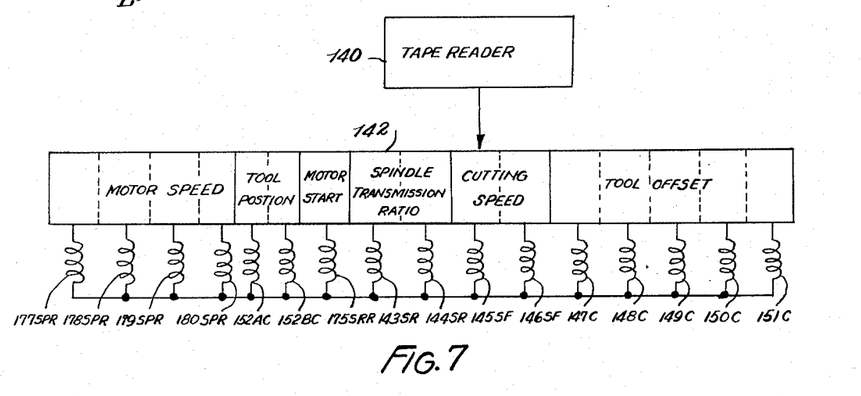
FIG. 7 is a block diagram showing of a tape control system embodying the present invention.

Referring to FIG. 7, a schematic diagram is shown indicating a typical method of controlling the constant speed cutting circuit with a tape reader. As shown in FIG. 7, a tape reader is schematically indicated by the reference numeral 140 and the tape reader sets a binary coded relay storage register 142 in accordance with the code on the tape. The tape may be a magnetic, photoelectric, or other type of conventional tape or intelligence-carrying record. The tape reader sets the register 142 which is a binary coded register and the register 142 contains a bank of relays designated by the reference numerals 143SR, 144SR, 145SF, 146SF, 147C, 148C, 149C, 150C, 151C, 152AC, 152BC. The relays are energized or de-energized depending upon whether a binary 1 or binary 0 bit is set in the register from the tape. The relays 143SR, 144SR, have contacts 143SR–1 and 144SR–1, respectively, in circuit with the relay coils 112SR, 113SR and which, when closed, effect energization of the coils provided an automatic relay 153AR is energized having contacts 153AR–1 connecting the contacts 143SR–1, 144SR–1 to the negative side of the power supply. Consequently, it can be seen that the spindle transmission ratio can be selected independently of the selector switch 110 in response to a tape by selectively energizing relay coils 143SR and 144SR. Similarly, the relay coils 145SR, 146SR have contacts 145SR–1, 146SR–1 which parallel the selector switch 110 to selectively effect the energization of relay coils 85SF, 86SF, respectively, when the automatic relay 153AR is energized and its contacts 153AR–2 are closed. Similarly, the relay coils 147C, 148C, 149C, 150C, 151C have contacts designated by the reference character with a "1" appended thereto which effect energization of the coils 65T . . . 68T and 70T, respectively, when the automatic operation relay 153AR is energized to close its contacts 153AR–3, and relay coils 152AC, 152BC have contacts 152AC–1 and 152BC–1 which when closed energize through contacts 153AR-8 of relay 153AR, conductors 123, 124 to control the energization of coils 97AC, 98BC, and 90CS.

The energization of the relay 153AR is preferably controlled by switch S as is shown in FIG. 5 and the energization of the relay preferably effects the closing of contacts 153AR-4 which energizes the tape reader 140.

It is desirable to be able to operate the machine tool without constant surface cutting speed and a selector switch 160 is provided for selecting a speed for the spindle drive motor 22 independently of the constant cutting speed selector switch 110. The switch 160 controls the energization of relay coils 161SP, 162SP, 163SP, 164SP and when the switch is in any of its positions a unique coil or combination of energized and de-energized relay coils 161SP . . . 164SP is set up to select the motor speed provided the hand operation relay 122HR is energized to connect one side of the switch to the negative side of the power supply by closing its contacts 122HR-4. The relay coils 161SP . . . 164SP control a plurality of taps of a multitapped potentiometer 166 connected across the power supply E. The contacts actuated by the relay coils 161SP . . . 164SP associated with the potentiometer 166 have been given the same reference character as the coil that actuates the contacts with a contact number applied thereto. It will be obvious to those skilled in the art that a unique voltage is obtained from the potentiometer 166 for each unique combination of de-energization and energization of the coils 161SP . . . 164SP.

The tap 167 is connected to the negative terminal of the tachometer 90 through normally closed contacts 97AC-5, 98BC-6 of the relay coils 97AC, 98BC so that the potentiometer circuit 166 can only be effective when the circuit is not set up for constant surface cutting speed. The positive terminal of the tachometer is connected to input terminal 46a by a connection 169 including the normally closed contacts 97AC-8, 98BC-8 of the relay coils 97AC, 98BC to make the connection effective only when the latter coils are de-energized. The relay coils 97AC, 98BC also have normally open, parallel-connected contacts 97AC-7, 98BC-7 connecting the center tap of the dividing circuit 53 to the input terminal 46A of the motor circuit 46 so that when the relay coils 97AC, 98BC are de-energized, the reference voltage circuit 76, the potentiometers 48, 51, and the dividing circuit 53 are cut out of the control circuit. The motor then operates in accordance with the setting of the potentiometer 166 and the tachometer 90 operates to provide a feed back voltage which cooperates with the voltage derived from the potentiometer 166 to control the speed of motor operation.

The circuit may include a start-stop control for the motor 22 and this is shown on the circuit diagram as including a motor contactor 170MS which is energizable by depressing a pushbutton switch 171 which completes a circuit from the negative side of the power supply to the motor contactor 170MS through the normally open contacts 122HR-5 of the manual operation relay and a stop pushbutton switch 172. The contactor 170MC, when energized, closes normally open contacts 170MS-1 to effect a holding circuit around the start switch 171 and closes normally open contacts 170MS-2 in the connection connected to the terminal 46a of the motor amplifier and opens normally closed contacts 170MS-3 which shunt the input terminals 46a, 46b of the motor control circuit 46. These latter contacts assure that no signal will be applied to the motor control circuit 46 when the motor is stopped by depressing the pushbutton switch 172.

The motor start contactor 170MS may be selectively energized by the tape control by providing a relay 175SRR which is shown in FIG. 7 and which is energized in accordance with the setting of the register 142. The relay 175SRR may have contacts 175SRR-1 in parallel with the start button 171 and stop button 172 and connected to the negative side of the power supply through normally open contacts 153AR-6 of the automatic control relay. Similarly, the register 142 may be provided with a motor speed selection section for controlling the energization of relay coils 177SPR, 178SPR, 179SPR and 180SPR which, when energized, close corresponding contacts, shown in FIG. 5 and designated by the relay reference character with a "1" appended thereto, to effect an energization of the coils 161SP . . . 164SP independently of the selector switch 160 provided the automatic relay is energized. These latter contacts are connected to L1 through the normally open contacts 153AR-7 of the automatic relay 153AR.

From the foregoing, it can be seen that the present invention provides a new and improved, simplified control system for maintaining a constant surface cutting speed as a tool moves transversely of the axis of a rotating workpiece with the speed being controlled by varying a linear potentiometer and which is capable of compensating for tool offset by increasing or decreasing resistance in the circuit in a direct relationship to the magnitude of the tool offset. Furthermore, the system is particularly adaptable for operation with tape-controlled machine tools or may be controlled manually, if so desired.

While the preferred embodiment has been described in considerable detail, it is hereby my intention to cover all modification, constructions and arrangements which fall within the ability of those skilled in the art and within the scope and spirit of the present invention.

Having described my invention, what I claim is:

1. In a motor control system a motor control circuit responsive to an error signal for increasing and decreasing motor speed in accordance with the sense of an input signal, a reference voltage supply connected to said motor control circuit to supply a reference voltage tending to increase the speed of said motor, electrical means responsive to motor speed and providing an output voltage dependent on motor speed and to be applied to said circuit in bucking relationship to said reference voltage, bridge means connecting said output voltage to said motor control circuit and defining a bridge network having a first pair of diagonally opposite terminals connected to said motor control circuit and a second pair of diagonally opposite terminals connected to the output of said electrical means, said bridge comprising at least one pair of resistances including at least one adjustable resistance serially connected between said second pair of terminals, one of said first pair of terminals being connected between the resistances, said bridge network further including variable resistance means connected between said second pair of terminals and including a slidable tap, the other of said first pair of terminals being connected to said slidable tap.

2. In a motor control system a motor control circuit responsive to an error signal for increasing and decreasing motor speed in accordance with the sense of an input signal, a reference voltage supply connected to said circuit to supply a direct current reference voltage tending to increase the speed of said motor, electrical means responsive to motor speed and providing an output voltage dependent on motor speed and to be applied to said circuit in bucking relationship to said reference voltage, bridge means connecting said output voltage to said motor control circuit and having a first pair of diagonally opposite terminals connected to said motor control circuit and a second pair of diagonally opposite terminals connected to the output of said electrical means, said bridge comprising adjustable resistance for varying the portion of said output voltage applied to said motor control circuit, said adjustable resistance having a tap movable along said resistance and constituting one of the terminals of the bridge to which said motor control circuit is connected, said resistance with said tap displaced from an end position being connected in two ratio legs of said bridge and the movement of said tap varying the resistance ratio of said legs and said bridge being balanced in an intermediate position of said tap along said resistance, said electrical means being connected to said bridge by connecting means actuatable to reverse the sense of the voltage being applied to the bridge whereby said tap can be moved from one end of said resistance to said intermediate position to decrease the portion of said output voltage applied to said motor control circuit from a maximum of one polarity to substantially zero and the connection of said electrical means to said bridge reversed to maintain the same polarity of voltage applied to said motor control circuit as said tap is moved from said intermediate position to the other end of said bridge to progressively increase the portion of said voltage output applied to said motor control circuit.

3. In a motor control system, the structure as defined in claim 2 wherein the other legs of said bridge different from the first-mentioned legs include additional adjustable resistance means comprising a plurality of resistance units selectively connectable into a first one or a second one of said other legs.

4. In a machine tool, a motor for effecting rotation of a workpiece relative to a tool, means supporting said tool and workpiece for relative movement transversely of the axis of rotation of the workpiece and including a slide movable along a path to effect said relative movement, means for mounting said tool in a reference position with respect to said slide in which the positions of said slide along said path corresponds to a corresponding predetermined distance of said tool from the axis of rotation, said tool being offsettable from said reference position, a control circuit for controlling the speed of said motor, said control circuit having input terminals, input circuit means comprising a reference voltage supply connected to said terminals to apply a signal voltage of a sense to increase the speed of said motor, electrical means providing an output voltage dependent on motor speed and means connecting said electrical means to said input terminals in opposition to said reference voltage including a voltage dividing circuit including a first variable element having a movable connection intermediate the terminals thereof, said movable element being connected to one of said input terminals for applying varying portions of said output voltage to said input terminals and a second variable circuit element for varying the portion of said output voltage applied to said input terminals, means connecting said slide to vary said first variable element as said slide moves along said path, and means for varying said second variable element in accordance with the magnitude of the offset of said tool from said reference position.

5. In a machine tool having a motor for rotating a workpiece about an axis, a control circuit for said motor having input terminals and responsive to the sense of an input error signal to change the motor speed in a direction corresponding to the sense of said signal, a slide movable transversely of said axis to effect relative movement between a tool and said workpiece, said slide being movable across the axis of the spindle whereby a tool may be moved toward the axis from either of two opposite directions, said control circuit for said motor including a four-terminal bridge circuit having first and second pairs of diagonally opposite terminals, said bridge circuit comprising a potentiometer having a tap connected to said slide and movable along the potentiometer as said slide moves to effect said movement transversely of said axis, said potentiometer resistance being connected between one pair of diagonally opposite terminals of said bridge with the tap of said potentiometer constituting one terminal of the other pair of diagonally opposite terminals of said bridge, a circuit connected across said other pair of terminals and comprising said input terminals and a reference voltage supply connected in series, electrical means responsive to the speed of said motor providing an output voltage dependent on motor speed, means connecting said electrical means to said one pair of diagonally opposite terminals to buck said reference voltage supply at said input terminals, said bridge being balanced with respect to the output of said electrical means when said tap is at an intermediate position on said potentiometer corresponding to a position of said slide wherein a tool thereon is at said axis, and means for interchanging the connections of the output of said electrical means to said bridge.

6. In a machine tool having a motor for rotating a workpiece about an axis, a control circuit for said motor having input terminals and responsive to the sense of an input error signal to change the motor speed in a direction corresponding to the sense of said signal; a slide movable transversely of said axis to effect relative movement between a tool and said workpiece, said slide being movable across the axis of the spindle whereby a tool may be moved toward the axis from either of two opposite directions; and an input circuit connected to said terminals including a four-terminal bridge circuit having first and second pairs of diagonally opposite terminals, said bridge circuit comprising a potentiometer having a tap connected to said slide and movable along the potentiometer as said slide moves to effect said movement transversely of said axis, said potentiometer resistance being connected between one pair of diagonally opposite terminals of said bridge with the tap of said potentiometer constituting one terminal of the other pair of diagonally opposite terminals of said bridge, a circuit connected across said other pair of terminals and comprising said input terminals and a reference voltage supply connected in series, electrical means responsive to the speed of said motor providing an output voltage dependent on motor speed, means connecting said electrical means to said one pair of diagonally opposite terminals to buck said reference voltage supply at said input terminals, said bridge being balanced with respect to the output of said electrical means when said tap is at an intermediate position on said potentiometer corresponding to a position of said slide wherein a tool thereon is at said axis, and means for interchanging the connections of the output of said electrical means to said bridge, the legs of said bridge connected between said one pair of terminals and to the terminal of said other pair different from said one terminal thereof including adjustable resistance for compensating for the position of the tool relative to said slide and adjustable to selectively increase or decrease the portion of said output voltage applied to said input terminals for a given setting of said tap.

7. In a machine tool, the structure as defined in claim 6 wherein said adjustable resistance comprises a first resistance and a second resistance having a middle tap dividing the second resistance into first and second halves with each half of the resistance being comprised of a plurality of resistance sections with the resistance sections on one side of the middle tap being a mirror image of the resistance sections on the other side of the middle tap, said tap constituting one of said different terminals of said bridge and said first resistance and said first half of said second resistance being connected into one leg of said bridge and the second half of said second resistance being connected into a different leg of said bridge, each resistance section on one side of said middle tap and the corresponding resistance section on the other side of said middle tap having a respective switch means associated therewith and operable between a first position in which the corresponding section in said first half of said second resistance is short-circuited and a second position wherein the corresponding section in the second half of said second resistance is short-circuited, said switch means all being in their first position when said tool is at reference position and said first resistance, and means for interchanging the connections of said first and second resistances in said bridge to connect said first resistance and said first half of said second resistance into said different leg and the second half of said second resistance into said one leg.

8. In a machine tool, the structure as defined in claim 7 wherein said switch means is controlled by a binary coded register and said sections of said second resistance have magnitudes related as the powers of 2.

9. In a motor control system including a motor for effecting the relative rotation of a workpiece and a tool in accordance with the distance of a tool from the axis of the workpiece and the position of a support member movable along a path to vary said distance, a control circuit for said motor, said circuit having input terminals and being responsive to the sense of an input signal to vary the speed of the motor in a direction dependent upon the sense of the signal, a reference voltage supply connected to said terminals and tending to increase the speed of said motor, electrical means responsive to motor rotation and providing an output voltage having a magnitude dependent on the relative rotation between the tool and workpiece, first circuit means connected across said electrical means for deriving a first voltage signal related to said output voltage by a predetermined factor and including a pair of serially connected adjustable circuit elements adjustable to vary said factor, means coupling said control circuit to a point intermediate said adjustable circuit elements, a second circuit means connected across said electrical means, means coupled intermediate said second circuit means and coupled to said control circuit for applying a portion of said voltage drop across said second circuit means to said control circuit including a movable element whose position determines the portion of the voltage drop across said second circuit element applied to said control circuit and means for connecting said movable element to said member for movement thereby, said first voltage signal establishing a reference position for said movable element and represent a limit position for control by said movable element when moving in one direction.

10. In a motor control system as defined in claim 9 wherein said first and second circuit means include means for interchanging the circuit connections to interchange the sense of said voltage signal and the portion of the voltage drop applied to said motor control circuit.

11. In a machine tool, a motor for effecting rotation of a workpiece relative to a tool, means supporting said tool and workpiece for relative movement transversely of the axis of rotation of the workpiece and including a slide movable along a path to effect said relative movement, means for mounting said tool in a reference position with respect to said slide in which the positions of said slide along said path corresponds to a corresponding predetermined distance of said tool from the axis of rotation, said tool being offsettable from said reference position, a control circuit for controlling the speed of said motor, said control circuit having input terminals, input circuit means comprising a reference voltage supply connected to said terminals to apply a signal voltage of a sense to increase the speed of said motor, electrical means providing an output voltage dependent on motor speed, a first voltage dividing circuit comprising a first variable circuit element connected across said electrical means to have said output voltage applied thereto and said first variable circuit element having terminal means at which a portion of said output voltage appears and being variable to linearly vary said portion, a second voltage dividing circuit connected across said electrical means including a second variable element having terminal means at which a portion of said second output voltage appears with the portion of said output voltage appearing at the terminal means being variable by varying said second circuit element, circuit means connecting said reference voltage supply and said motor control circuit in a circuit between said terminal means to connect the voltage appearing across said terminal means in opposition to said reference voltage, means connecting said slide to vary said first variable element as said slide moves along said path, and means for varying said second variable element in accordance with the magnitude of the offset of said tool from said reference position.

References Cited by the Examiner

UNITED STATES PATENTS

| 2,489,725 | 11/49 | Rutemiller | 74—745 |
| 2,657,587 | 11/53 | Volk et al. | 74—365 |
| 2,897,427 | 7/59 | Brodburn | 318—145 |

FOREIGN PATENTS

| 749,374 | 4/53 | Great Britain. |
| 974,938 | 10/50 | France. |

WILLIAM W. DYER, JR., *Primary Examiner.*